United States Patent
Machani et al.

(10) Patent No.: US 9,648,012 B1
(45) Date of Patent: May 9, 2017

(54) AUTOMATIC PROPAGATION OF PASSWORD UPDATES ON MULTIPLE DEVICES

(71) Applicant: EMC Corporation, Hopkinton, MA (US)

(72) Inventors: Salah Machani, Toronto (CA); Peter Alan Robinson, Enoggera Reservoir (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

(21) Appl. No.: 14/752,141

(22) Filed: Jun. 26, 2015

(51) Int. Cl.
  *H04L 9/08* (2006.01)
  *H04L 29/06* (2006.01)
  *H04L 9/32* (2006.01)

(52) U.S. Cl.
  CPC .............. *H04L 63/083* (2013.01); *H04L 9/08* (2013.01); *H04L 9/3218* (2013.01); *H04L 63/061* (2013.01)

(58) Field of Classification Search
  CPC ... H04L 63/083; H04L 63/061; H04L 9/3218; H04L 9/08
  See application file for complete search history.

(56) References Cited

U.S. PATENT DOCUMENTS

| | | | |
|---|---|---|---|
| 7,634,659 B2 | 12/2009 | Fahrny | |
| 7,725,730 B2* | 5/2010 | Juels | H04L 63/083 340/5.85 |
| 8,087,074 B2* | 12/2011 | Popp | H04L 9/3228 713/159 |
| 8,302,204 B2 | 10/2012 | Grummt | |
| 9,455,968 B1 | 9/2016 | Machani et al. | |
| 2002/0071566 A1 | 6/2002 | Kurn | |
| 2004/0030932 A1* | 2/2004 | Juels | H04L 63/083 713/151 |
| 2004/0117649 A1* | 6/2004 | Whyte | H04L 9/0891 380/286 |
| 2009/0313687 A1* | 12/2009 | Popp | H04L 9/3228 726/9 |
| 2012/0323777 A1 | 12/2012 | Liberty | |
| 2013/0185815 A1 | 7/2013 | Leotsarakos | |

OTHER PUBLICATIONS

Keita Emura, et al.; "Ideal Secret Sharing Schemes With Share Selectability," Proceedings of the 13th International Conference of Information and Communications Security (ICICS 2011), Beijing, China; Nov. 23-26, 2011; pp. 143-157.

Salah Machani, et al.; "System and Method for Key Material Protection on Devices Using a Secret Sharing Scheme"; U.S. Appl. No. 14/319,276, filed Jun. 30, 2014.

Salah Machani, et al.; "Protecting Master Encryption Keys in a Distributed Computing Environment"; U.S. Appl. No. 14/575,295, filed Dec. 18, 2014.

Salah Machani, et al.; "Cryptographic Key Splitting for Offline and Online Data Protection"; U.S. Appl. No. 14/752,519, filed Jun. 26, 2015.

* cited by examiner

*Primary Examiner* — Ellen Tran
(74) *Attorney, Agent, or Firm* — BainwoodHuang

(57) ABSTRACT

Embodiments are directed to techniques to automatically propagate password updates onto other devices that use a shared password to protect respective secure keys or other secrets. This may be done by calculating update data using a new password and an old password entered onto one device as part of a password change operation, and sending the update data to the other devices for use in updating the password on those devices.

20 Claims, 5 Drawing Sheets

AUTOMATIC PROPAGATION OF PASSWORD UPDATES ON MULTIPLE DEVICES

BACKGROUND

A user of a computing device may use a password to access that device. In order to increase security, a secure key may be used on the device. The user's password may be a share of the secure key, which, together with a local share stored on the computing device, may be used to unlock the secure key. In some systems, a user is able to operate the computing device without entering his password when the computing device is online and able to access a remote share in the cloud.

SUMMARY

Unfortunately, the above-described conventional systems may suffer from deficiencies. If a user has multiple devices, he may wish to use the same password on all of the devices in order to avoid having to remember several passwords. It is possible to use a single password for use with different secure keys on different devices using techniques similar to those described in U.S. patent application Ser. No. 14/577, 206 entitled "PROTECTION OF A SECRET ON A MOBILE DEVICE USING A SECRET-SPLITTING TECHNIQUE WITH A FIXED USER SHARE" by Salah Machani, Nikolaos Triandopoulos, and Lawrence N. Friedman, filed on Dec. 19, 2014, the entire contents and teachings of which are incorporated herein in their entirety by this reference. However, if the user updates his password on one device, the password change will not propagate to the other devices, requiring the user to update his password on each device separately.

Thus, it would be desirable to provide techniques to automatically propagate password updates onto other devices that use a shared password to protect respective secure keys or other secrets. This may be done by calculating update data using a new password and an old password entered onto one device as part of a password change operation, and sending the update data to the other devices for use in updating the password on those devices.

A method performed by a computing device configured to implement a (t, n) Shamir secret sharing scheme, the (t, n) Shamir secret sharing scheme providing access to a secret upon any t out of n shares being known for an integer t≥2 for an integer n>t is provided. The method includes (a) receiving, from a user, a password-update command including a new password that supersedes an old password, the old password defining an old password share and the new password defining a new password share, the new password share superseding the old password share as a user password share of the (t, n) Shamir secret sharing scheme implemented by the computing device, (b) calculating update data using the new password share and the old password share, (c) updating one or more local shares of the (t, n) Shamir secret sharing scheme implemented by the computing device to be usable in conjunction with the new password share rather than the old password share to provide access to a secret key, and (d) sending the update data to another computing device configured to implement the (t, n) Shamir secret sharing scheme to provide access to another secret key, the other computing device being configured to update one or more local shares of the other computing device of the (t, n) Shamir secret sharing scheme implemented by the other computing device using the update data, permitting the user to utilize the other computing device to reconstruct the other secret key without entering the old password. An apparatus, computer program product, and system for performing similar methods are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques to automatically propagate password updates onto other devices that use a shared password to protect respective secure keys or other secrets. This may be done by calculating update data using a new password and an old password entered onto one device as part of a password change operation, and sending the update data to the other devices for use in updating the password on those devices.

Figure 1:
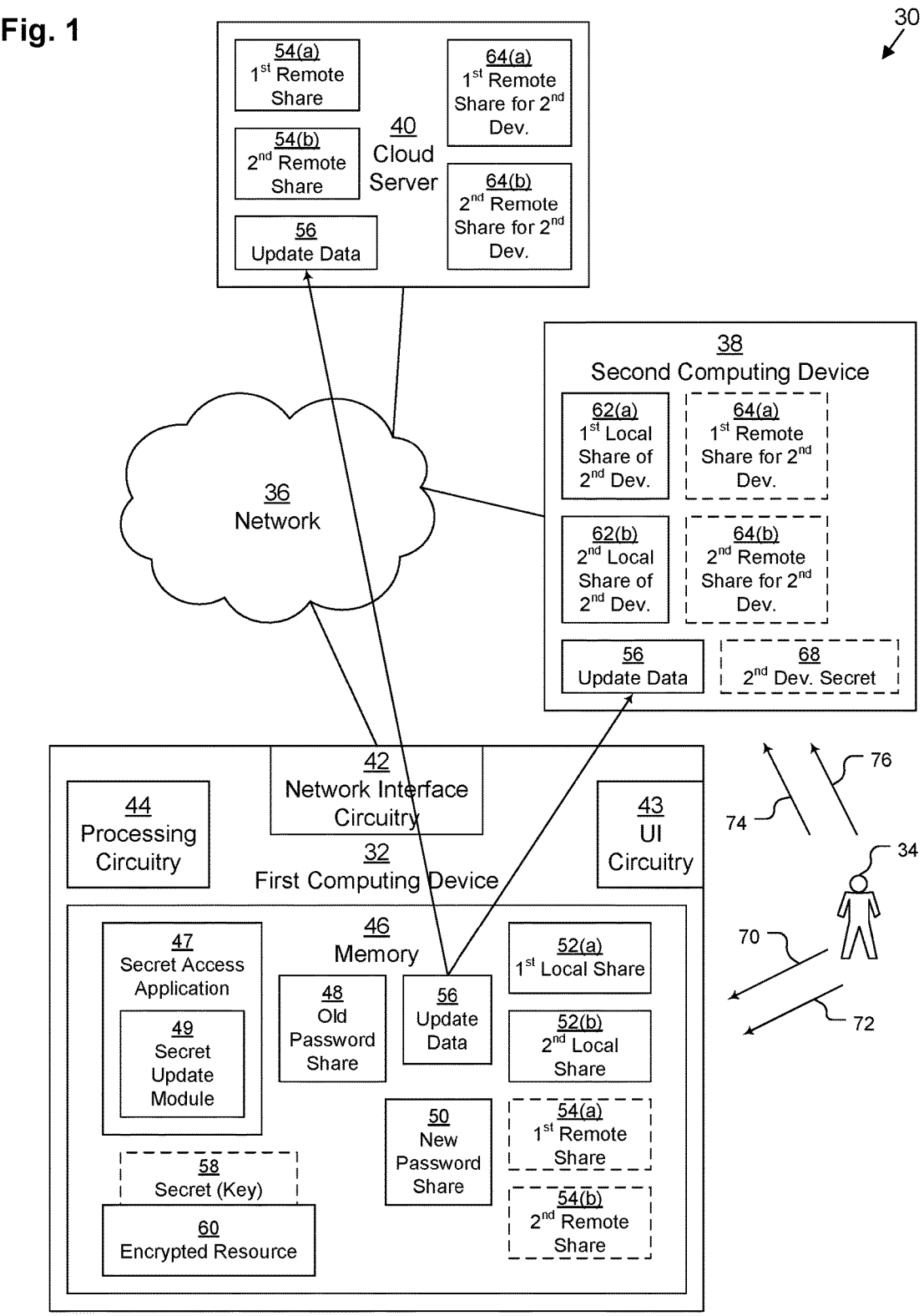
FIG. 1 is a block diagram depicting an example system and apparatus for use in connection with various embodiments.

FIG. 1 depicts a system 30. System 30 includes a first computing device 32 connected to second computing device 38 and a cloud server 40 over a network 36. In some embodiments, there may be additional other computing devices 38 within the system 30 as well.

First computing device 32 may be any kind of computing device, such as, for example, a personal computer, a workstation computer, a laptop computer, a mobile computing device, a smartphone, a tablet computer, a server computer, etc. Typically, however, first computing device 32 is a mobile device, such as a smartphone or a tablet, or a personal computer. First computing device 32 is under the control of a user 34.

First computing device includes network interface circuitry 42, user interface (UI) circuitry 43, processing circuitry 44, and memory 46.

Network interface circuitry 42 may include one or more Ethernet cards, cellular modems, Fibre Channel adapters, Wireless Fidelity (WiFi) wireless networking adapters, any other devices for connecting to network 36, or some combination thereof. Network 36 may be any kind of network suitable for interconnecting computing devices, such as, for example, a local area network, a wide area network, a storage area network, a virtual private network, a cellular data network, an interconnected fabric of switched connections, a point-to-point connection, or some combination of the above.

UI circuitry 43 interfaces with one or more UI devices (not depicted) that allow the user 34 to input and receive data to and from the computing device 32. For example, UI circuitry 43 may include a serial bus adapter, a graphics adapter, etc., while the UI devices may include one or more of a display device (e.g., a CRT, LCD, plasma, or LED monitor) and an input device (e.g., a mouse, trackpad, tracking stick, keyboard, microphone, biometric sensor, etc.).

Processing circuitry 44 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 46 may be any kind of digital system memory, such as, for example, random access memory (RAM). Memory 46 stores an executing operating system (OS, not depicted) and one or more applications (e.g., secret access application 66) executing on processing circuitry 44 as well as data used by those applications. Memory 46 stores an old password share 48, a new password share 50, one or more local shares 52 (depicted as first local share 52(a), second local share 52(b)), update data 56, and an encrypted resource 60. At various points, memory 46 may also ephemerally store one or more remote shares 54 (depicted as first remote share 54(a), second remote share 54(b)) and a secret key 58 used to encrypt the encrypted resource 60. Secret access application 47 within memory 46 includes a secret update module 49, used to implement certain embodiments.

In some embodiments, memory 46 may also include a persistent storage portion (not depicted). Persistent storage may be made up of one or more persistent storage devices, such as, for example, hard disk drives, solid-state storage devices, flash drives, etc. Persistent storage is configured to store programs and data even while the computing device 32 is powered off. The OS (e.g., Linux, UNIX, Windows, or a similar operating system) and the applications (e.g., secret access application 47) are typically stored in persistent storage so that they may be loaded into memory 46 from persistent storage upon a system restart. These applications, when stored in non-transient form either in the volatile portion of memory 46 or in persistent storage, form a computer program product. The processing circuitry 44 running one or more of these applications thus forms a specialized circuit constructed and arranged to carry out the various processes described herein. The persistent storage may also store certain data, such as, for example, old password share 48, new password share 50, and local shares 52 so that this data may be restored to the volatile portion of memory 46 upon a system restart. In some embodiments, encrypted resource 60 may be stored entirely within persistent storage rather than within the volatile portion of memory 46.

User 34 may operate first computing device 32 to run secret access application 47 in order to gain access to the encrypted resource 60. Secret key 58 may be protected using a secret sharing scheme, such as, for example, a (t, n) Shamir secret sharing scheme, meaning that upon the secret access application 47 having access to at least t (for an integer t, t being at least two, and more commonly at least three) shares (e.g., password shares 48, 50, local shares 52, remote shares 54) out of n total shares, secret access application 47 is able to reconstruct secret key 58, allowing it to access the encrypted resource 60. Initially, user 34 enters an old password 70 into the computing device 32 using UI circuitry 43. In some embodiments, old password 70 is then (temporarily, for the length of a user session) stored as old password share 48 within memory 46. In other embodiments, old password 70 is transformed (e.g., using a key derivation function) into old password share 48 to be stored (temporarily, for the length of a user session) within memory 46.

In embodiments in which a (3, 5) Shamir secret sharing scheme is used, there are two locally-stored local shares 52(a), 52(b). Thus, secret access application 47 is able to recreate the secret key 58 using the old password share 48 and the two locally-stored local shares 52(a), 52(b). If the first computing device 32 is connected to network 34 and able to communicate with cloud server 40 (i.e., operating in "online mode" rather than "offline mode"), secret access application 47 is able to temporarily retrieve at least one remote share 54, allowing secret access application 47 to recreate the secret key 58 using the two locally-stored local shares 52(a), 52(b) and the at least one remote share 54.

In embodiments in which a (2, 3) Shamir secret sharing scheme is used, there is only one locally-stored local shares 52. Thus, secret access application 47 is able to recreate the secret key 58 using the old password share 48 and the locally-stored local share 52. In these embodiments, there is also only one remote share 54. Thus, if the first computing device 32 is connected to network 34 and able to communicate with cloud server 40, secret access application 47 is able to temporarily retrieve remote share 54, allowing secret access application 47 to recreate the secret key 58 using the locally-stored local share 52 and the remote share 54.

Second computing device 38 is similar to first computing device 32, having a similar hardware structure and also running a secret access application (not depicted). Second computing device 38 has its own secret (e.g., secret key) 68, which it is also able to reconstruct with the (t, n) Shamir secret sharing scheme, but using its own local shares 62 (depicted as first local share of second device 62(a), second local share of second device 62(b)). The user 34 may also enter in an old password 74 in offline mode to aid in the reconstruction of the other secret 68, however, in order to simplify what the user 34 needs to remember, this old password 74 is the same as the old password 70 used for the first computing device 32. In online mode, the second computing device 38 is able to use its local shares 62 and at least one of its own remote shares 64 retrieved from cloud server 40 to reconstruct the secret 68.

It should be understood that the first computing device 32 and the second computing device 38 have one share in common, namely the old password share, derived from the old password 70, 74 of the user 34, but the remaining of the n shares for each device 32, 38 are different, allowing each device 32, 38 to have a different secret key 58, 68.

There may also be additional computing devices (not depicted) under the control of the user 34, each having its own respective secret key protected by a (t, n) Shamir secret sharing scheme with the old password share 48 as one of its shares.

Cloud server 40 may also be similar in its hardware structure to first computing device 32, although typically cloud server will be a high-powered server computer permanently connected to network 36. Cloud server 40 stores remote shares 54, 64 for the first computing device 32 and the second computing device 38, respectively, typically in persistent storage. Before providing a remote share 54, 64 to any computing device 32, 38, cloud server 40 will typically require some form of authentication to ensure that it is communicating with an authorized device.

If the user wishes to change his password, then the user 34 may operate secret update module 49 on the first computing device 49 to enter a new password 72. In some embodiments, the password update process also requires the user 34 to re-enter the old password 70. New password 72 may either be directly stored as new password share 50 or new password 72 may be used to derive new password share 50, as described above in connection with the old password 70. Secret update module 49 is then able to update the local shares 52 to be consistent with the new password while still protecting the same secret key 58. Secret update module 49 also generates update data 56 using both the old password share 48 and the new password share 50, and sends the update data 56 to the cloud server 40 to allow the cloud server 40 to update the remote shares 54. Secret update module 49 also sends the update data 56 to the second computing device 38 to allow the second computing device 38 to also update its local shares 62 so that the user 34 does not need to engage in a separate password update process on the second computing device 38. Cloud server 40 may also use the update data 56 to update its remote shares 64 for the second computing device 38.

Figure 2:
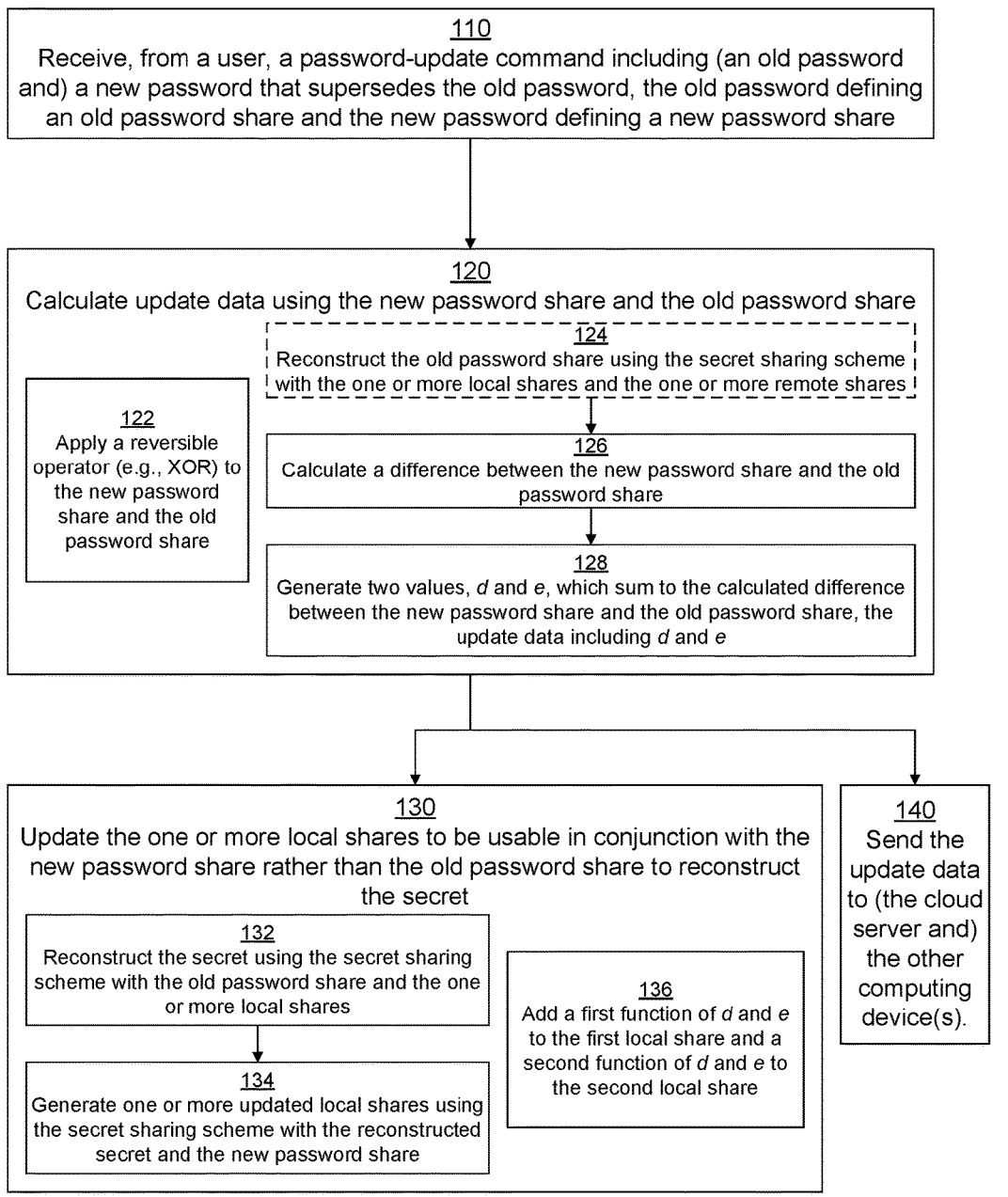
FIG. 2 is a flowchart depicting an example method performed by a first device according to various embodiments.
Figure 3:
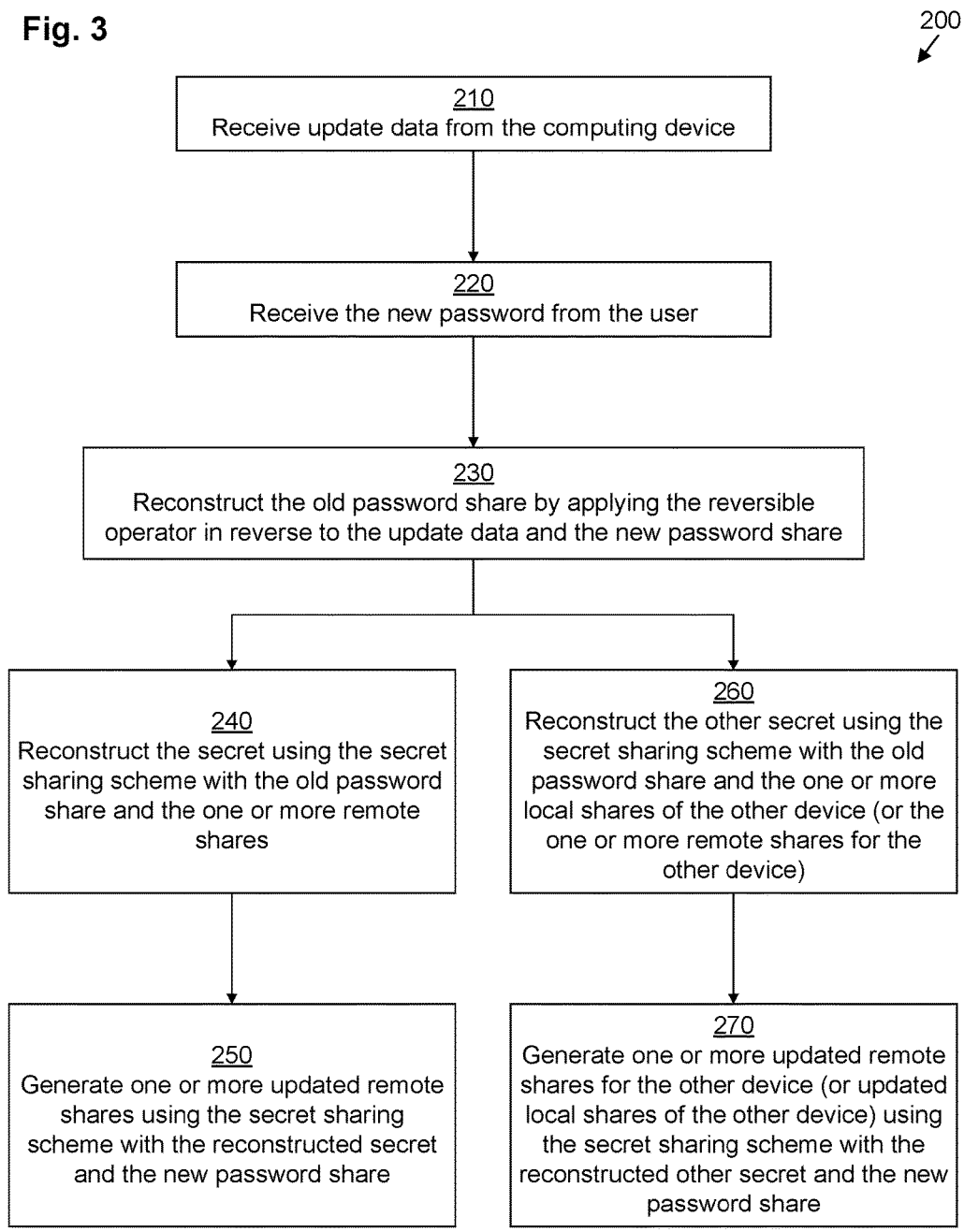
FIG. 3 is a flowchart depicting an example method performed by a device remote from the first device according to various embodiments.
Figure 4:
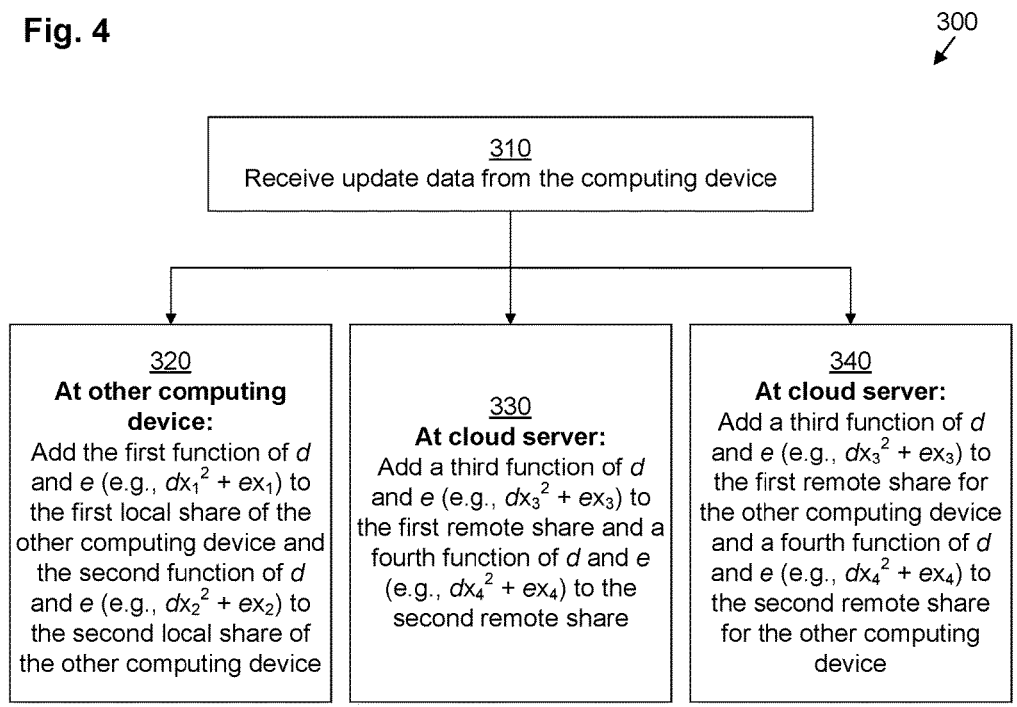
FIG. 4 is a flowchart depicting an example method performed by a device remote from the first device according to other embodiments.

The operation of secret update module 49 is described according to various embodiments in FIG. 2, while the related operation of the second computing device 38 and the cloud server 40 during the password update process are described according to various embodiments in FIGS. 3 and 4.

FIG. 2 depicts an example method 100 performed by first computing device 32 for automatically propagating password updates onto other devices 38 that use a shared password to protect respective secure keys or other secrets. It should be understood that any time a piece of software (e.g., secret access application 47, secret update module 49, etc.) is described as performing a method, process, step, or function, in actuality what is meant is that a computing device or distributed computing system (e.g., first computing device 32, second computing device 38, cloud server 40, etc.) on which that piece of software is running performs the method, process, step, or function when executing that piece of software on its processing circuitry 44. It should be understood that although depicted in one order, one or more steps or sub-steps may be combined together or performed in a different order.

In step 110, secret update module 49 operating on first computing device 32 receives a password update command from user 34. The password update command includes a new password 72 to supersede an old password 70. In some embodiments the password update command also includes the old password 70, although this may not be needed when the user 34 is already logged in. In some embodiments, step 110 may be performed using a password update wizard, as is well-known in the art. The new password 72 may be transformed and stored in memory 46 as new password share 50.

In step 120, secret update module 49 calculates update data 56 using the new password share 50 and the old password share 48. Step 120 may be performed in various ways, including either sub-step 122 or sub-steps 124-128.

In sub-step 122, which is only performed in embodiments in which the user 34 enters the old password 70 as part of step 110, secret update module 49 applies a reversible operator to the new password share 50 and the old password share 48, using the result as the update data 56. Various reversible operators may be used, but preferably a reversible operator that provides no information leakage about either the old password 70 or the new password 72 should be used, For example, the reversible operator may be an exclusive-or (XOR) operator that operates on the bits of the new password share 50 and the old password share 48.

Alternatively, sub-steps 124-128 may be performed instead of sub-step 122. Sub-step 124 is optional, only being performed in embodiments in which the user 34 did not enter the old password 70 as part of step 110. Thus, in sub-step 124, secret update module 49 reconstructs the old password share 48 using the (t, n) Shamir secret sharing scheme with the local shares 52 and the remote shares 54 as inputs. If a (2, 3) scheme is used, then the one local share 52 is combined with the one remote share 54 to recreate the polynomial underlying the sharing, allowing the old password share 48 to be calculated (e.g., by applying the polynomial to a pre-defined input, such as an input of the value one). If a (3, 5) scheme is used, then both local shares 52(a), 52(b) are combined with the one of the remote shares 54(a), 54(b) (or, possibly, one of the local shares 52(a), 52(b) is combined with the both of the remote shares 54(a), 54(b)) to recreate the polynomial underlying the sharing, allowing the old password share 48 to be calculated (e.g., by applying the polynomial to a pre-defined input, such as an input of the value one).

Then, in sub-step 126, secret update module 49 calculates a difference between the new password share 50 and the old password share 48 (i.e., using a subtraction operation). Then, in sub-step 128, secret update module 49 generates two values, d and e, which sum to the difference calculated in sub-step 126. This may be done, for example, by randomly choosing d and then setting e as the difference between the difference from sub-step 126 and d. Thus, the values d and e make up the update data 56.

In step 130, which, in some embodiments may be performed in parallel with or prior to step 120, secret update module 49 updates the local shares 52 to be usable in conjunction with the new password share 50 in place of the old password share 48 to reconstruct the secret key 58. Step 130 may be performed in various ways, including either sub-steps 132-134 or sub-step 136.

In sub-step 132, secret update module 49 reconstructs the secret key 58 using at least t shares (possibly using the old password share 48 and the local shares 52 or possibly using the local shares 52 and the remote shares 54) by reconstructing the polynomial and applying it to a fixed x-value (e.g., x=0). Then, in sub-step 134, secret update module 49 generates updated local shares 52 using the (t, n) Shamir secret sharing scheme with the reconstructed secret key 58 and the new password share 50 as inputs. Thus, a new polynomial is selected with those constraints, allowing the local shares 52 to be generated based on the new polynomial.

Alternatively, sub-step 136 may be performed. In sub-step 136, instead of directly calculating the underlying polynomial for the (t, n) Shamir secret sharing scheme, the update value from sub-step 128 may be used. Thus, a function of d and e is added to each local share 52(a), 52(b) to give those local shares 52(a), 52(b) updated values. For example, if the underlying polynomial is $f_1(x)$ and local share 52(a) is defined as $f_1(x_1)$ and local share 52(b) is defined as $f_1(x_2)$ for some pre-selected values $x_1$, $x_2$, then the value $dx_1^2+ex_1$ is added to local share 52(a) and the value $dx_2^2+ex_2$ is added to local share 52(b).

In step 140, which may be performed in parallel with step 130, or before or after, secret update module 49 sends the update data 56 over the network 36 to the second computing device 38 and/or to the cloud server 40. Sending the update data 56 to the cloud server 40 allows the remote shares 54 to be updated, while sending the update data 56 to the second computing device 38 allows the password to also be updated on the second computing device 38.

FIGS. 3 and 4 depict the operation of the second computing device 38 and the cloud server 40 upon receiving the update data 56 according to different embodiments. FIG. 3 depicts embodiments in which the update data 56 has been calculated as in sub-step 122, while FIG. 4 depicts embodiments in which the update data 56 has been calculated as in sub-step 128.

FIG. 3 depicts a method 200 performed by either the second computing device 38 or the cloud server 40. When performed on the cloud server 40, steps 210-250 are performed to update the remote shares 54 on the cloud server 40. In addition, steps 260-270 may also performed (omitting the parenthetical text) to additionally update the other remote shares 64 for the second computing device 38 on the cloud server 40. When method 200 is performed on the second computing device 38 to update the local shares 62 on the second computing device 38, steps 240 and 250 are omitted, and the parenthetical text is used in steps 260 and 270 instead of the main text.

In step 210, the second computing device 38 and/or the cloud server 40 receive the update data 56 from the first computing device 32. In step 220, the user 34 enters the new password 72 into the second computing device 38 and/or the cloud server 40, allowing the new password share 50 to be generated, as described above. Thus, method 200 may be performed in conjunction with the user 34 logging into second computing device 38.

In step 230, the second computing device 38 and/or the cloud server 40 reconstructs the old password share 48 by applying the reversible operator in reverse to the update data 56 and the new password share 50. In the case of the XOR operator, the update data 56 can simply be XORed with the new password share 50.

In step 240, the cloud server 40 reconstructs the secret key 58 using the (t, n) Shamir secret sharing scheme with the old password share 48 and one or both of the remote shares 54 (depending whether it is a (2, 3) or a (3, 5) scheme) as inputs. Then, in step 250, the cloud server 40 updates the remote share(s) 54 using the (t, n) Shamir secret sharing scheme with the reconstructed secret key 58 and the new password share 50 as inputs. For example, if the underlying polynomial is originally $f_1(x)$ but updated to $f_1'(x)$ in step 240 and remote share 54(a) is initially defined as $f_1(x_3)$ and remote share 54(b) is initially defined as $f_1(x_4)$ for some pre-selected values $x_3$, $x_4$, then remote share 54(a) is updated to be to $f_1'(x_3)$, and remote share 54(b) is updated to be to $f_1'(x_4)$.

In step 260, the cloud server 40 reconstructs the other secret key 68 using the (t, n) Shamir secret sharing scheme with the old password share 48 and one or both of the other remote shares 64 (depending whether it is a (2, 3) or a (3, 5) scheme) as inputs. Then, in step 270, the cloud server 40 updates the other remote share(s) 64 using the (t, n) Shamir secret sharing scheme with the reconstructed other secret key 68 and the new password share 50 as inputs. For example, if the underlying polynomial is originally $f_2(x)$ but updated to $f_2'(x)$ in step 260 and other remote share 64(a) is initially defined as $f_2(x_3)$ and other remote share 64(b) is initially defined as $f_2(x_4)$ for some pre-selected values $x_3$, $x_4$, then other remote share 64(a) is updated to be to $f_2'(x_3)$, and other remote share 64(b) is updated to be to $f_2'(x_4)$.

In step 260, the second computing device 38 reconstructs the other secret key 68 using the (t, n) Shamir secret sharing scheme with the old password share 48 and one or both of the other local shares 62 (depending whether it is a (2, 3) or a (3, 5) scheme) as inputs. Then, in step 270, the second computing device 38 updates the other local share(s) 62 using the (t, n) Shamir secret sharing scheme with the reconstructed other secret key 68 and the new password share 50 as inputs. For example, if the underlying polynomial is originally $f_2(x)$ but updated to $f_2'(x)$ in step 260 and other local share 62(a) is initially defined as $f_2(x_1)$ and other local share 62(b) is initially defined as $f_2(x_2)$ for some pre-selected values $x_1$, $x_2$, then other local share 62(a) is updated to be to $f_2'(x_1)$, and other local share 62(b) is updated to be to $f_2'(x_2)$.

FIG. 4 depicts a method 300 performed by either the second computing device 38 or the cloud server 40. When performed on the cloud server 40, steps 310 and 330 are performed to update the remote shares 54 on the cloud server 40. In addition, step 340 may also performed to additionally update the other remote shares 64 for the second computing device 38 on the cloud server 40. When method 300 is performed on the second computing device 38 to update the local shares 62 on the second computing device 38, steps 310 and 320 are performed.

In step 310, the second computing device 38 and/or the cloud server 40 receive the update data 56 from the first computing device 32.

In step 320, the second computing device 38 adds the same functions of d and e as in sub-step 136 to the other local shares 62 on the second computing device 38 to update those values. Thus, for example, if the underlying polynomial on the second computing device 38 is $f_2(x)$ and other local share 62(a) is defined as $f_2(x_1)$ and other local share 62(b) is defined as $f_2(x_2)$ for the pre-selected values $x_1$, $x_2$, then the value $dx_1^2+ex_1$ is added to other local share 62(a) and the value $dx_2^2+ex_2$ is added to other local share 62(b).

In step 330, the cloud server 40 adds other functions of d and e to the remote shares 54 on the cloud server 40 to update those values. Thus, for example, if the underlying polynomial on the first computing device 32 is $f_1(x)$ and remote share 54(a) is defined as $f_1(x_3)$ and remote share 54(b) is defined as $f_1(x_4)$ for pre-selected values $x_3$, $x_4$, then the value $dx_3^2+ex_3$ is added to remote share 54(a) and the value $dx_4^2+ex_4$ is added to remote share 54(b).

In step 340, the cloud server 40 adds these other functions of d and e to the other remote shares 64 for the second computing device 38 on the cloud server 40 to update those values. Thus, for example, if the underlying polynomial on the second computing device 38 is $f_2(x)$ and other remote share 64(a) is defined as $f_2(x_3)$ and other remote share 64(b) is defined as $f_2(x_4)$ for the pre-selected values $x_3$, $x_4$, then the value $dx_3^2+ex_3$ is added to other remote share 64(a) and the value $dx_4^2+ex_4$ is added to other remote share 64(b).

Figure 5:
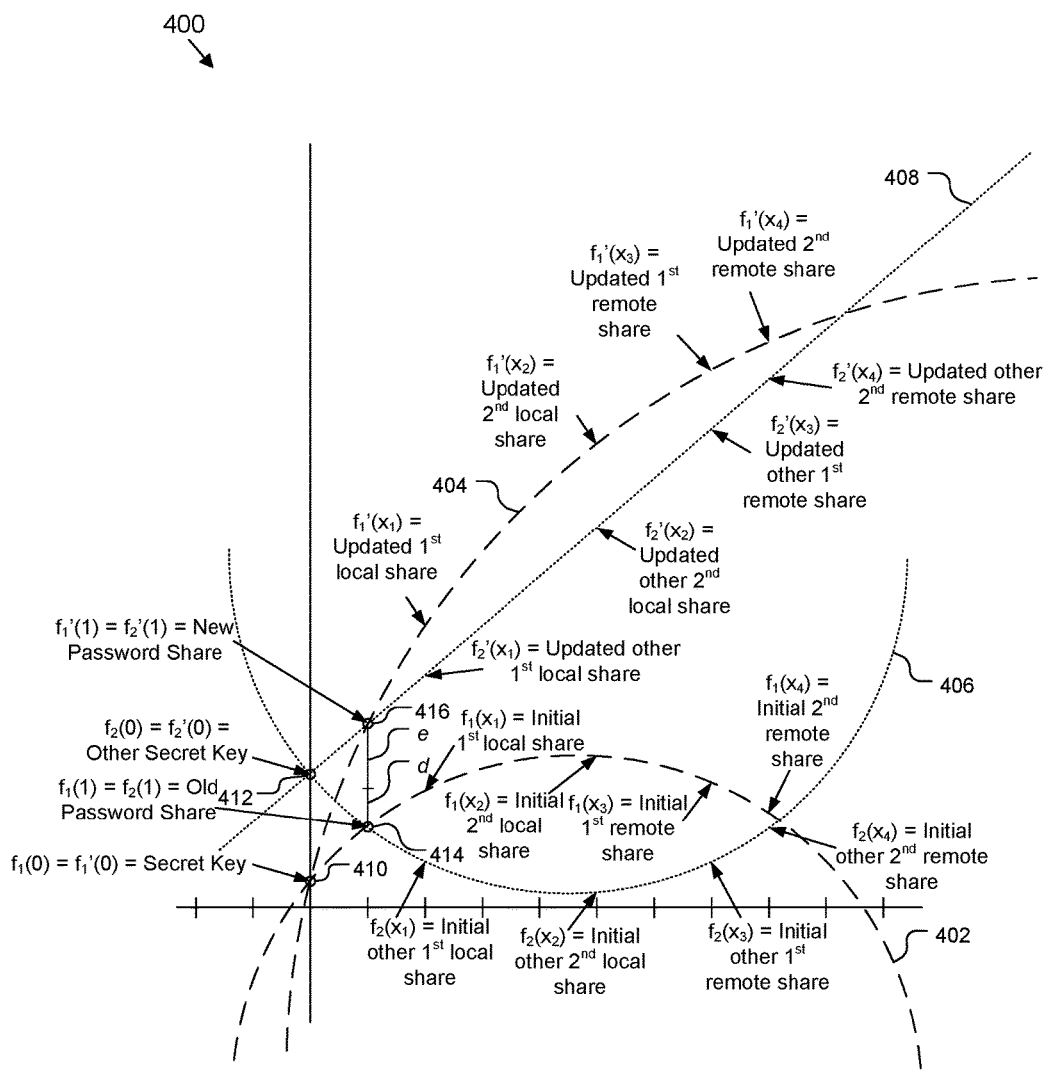
FIG. 5 is a graph depicting an example method according to various embodiments.

The operation of the embodiments of FIG. 4 may be better illustrated with reference to the graph 400 in FIG. 5. Graph 400 depicts an initial curve 402 defined by initial polynomial $f_1$ associated with old password share 48 on first computing device 32, an updated curve 404 defined by updated polynomial $f_1'$ associated with new password share 50 on first computing device 32, an initial curve 406 defined by initial polynomial $f_2$ associated with old password share 48 on second computing device 38, and an updated curve 408 defined by updated polynomial $f_2'$ associated with new password share 50 on second computing device 38.

Polynomial $f_1$ may be defined by $f_1(x)=a_1x^2+b_1x+c_1$ mod p for a pre-selected prime integer p.

Polynomial $f_2$ may be defined by $f_2(x)=a_2x^2+b_2x+c_2$ mod p.

First computing device 32 has a secret key 58, which is equal to $f_1(0)=f_1'(0)=c_1$, defined by y-intercept 410. Second computing device 38 has other secret key 68, which is equal to $f_2(0)=f_2'(0)=c_2$, defined by y-intercept 412.

Initially, the old password share 48 is equal to $f_1(1)=f_2(1)=a_1+b_1+c_1$ mod p, defined by point 414.

Thus, in the initial configuration defined by the old password share 48, first computing device 32 stores first local share 52(*a*) defined by a point on curve 402 at $f_1(x_1)$ and second local share 52(*b*) defined by a point on curve 402 at $f_1(x_2)$, while first remote share 54(*a*) is defined by a point on curve 402 at $f_1(x_3)$ and second remote share 54(*b*) is defined by a point on curve 402 at $f_1(x_4)$.

Similarly, in the initial configuration defined by the old password share 48, second computing device 38 stores first other local share 62(*a*) share defined by a point on curve 406 at $f_2(x_1)$ and second other local share 62(*b*) defined by a point on curve 406 at $f_2(x_2)$, while first other remote share 64(*a*) is defined by a point on curve 406 at $f_2(x_3)$ and second other remote share 64(*b*) is defined by a point on curve 406 at $f_2(x_4)$.

However, upon the new password 72 being entered, the new password share 50 is equal to $f_1'(1)=f_2'(1)=a_1+b_1+c_1+d+e \bmod p$, defined by point 416.

Thus, the distance from point 414 to point 416 is defined to be d+e, allowing any values of d and e to be selected. As depicted, d and e are both positive values, although that is by way of example only. The values chosen for d and e define $f_1'$ and $f_2'$ by the formulae $f_1(x)=(a_1+d)x^2+(b_1+e)x+c_1 \bmod p$ and $f_2(x)=(a_2+d)x^2+(b_2+e)x+c_2 \bmod p$.

Thus, updated values for the local shares 52, remote shares 54, other local shares 62, and other remote shares 64 can be calculated as follows:

Updated first local share 52(*a*) is:

$$f_1'(x_1)=(a_1+d)x_1^2+(b_1+e)x_1+c_1 \bmod p = f_1(x_1)+dx_1^2+ex_1 \bmod p$$

which is equal to the initial first local share 52(*a*) plus $dx_1^2+ex_1$.

Updated second local share 52(*b*) is:

$$f_1'(x_2)=(a_1+d)x_2^2+(b_1+e)x_2+c_1 \bmod p=(x_2)+dx_2^2+ex_2 \bmod p$$

which is equal to the initial second local share 52(*b*) plus $dx_2^2+ex_2$.

Updated first remote share 54(*a*) is:

$$f_1'(x_3)=(a_1+d)x_3^2+(b_1+e)x_3+c_1 \bmod p=(x_3)+dx_3^2+ex_3 \bmod p$$

which is equal to the initial first remote share 54(*a*) plus $dx_3^2+ex_3$.

Updated second remote share 54(*b*) is:

$$f_1'(x_4)=(a_1+d)x_4^2+(b_1+e)x_4+c_1 \bmod p=(x_4)+dx_4^2+ex_4 \bmod p$$

which is equal to the initial second remote share 54(*b*) plus $dx_4^2+ex_4$.

Updated first other local share 62(*a*) is:

$$f_2'(x_1)=(a_2+d)x_1^2+(b_2+e)x_1+c_2 \bmod p = f_2(x_1)+dx_1^2+ex_1 \bmod p$$

which is equal to the initial first other local share 62(*a*) plus $dx_1^2+ex_1$.

Updated second other local share 62(*b*) is:

$$f_2'(x_2)=(a_2+d)x_2^2+(b_2+e)x_2+c_2 \bmod p = f_2(x_2)+dx_2^2+ex_2 \bmod p$$

which is equal to the initial second other local share 62(*b*) plus $dx_2^2+ex_2$.

Updated first other remote share 64(*a*) is:

$$f_2'(x_3)=(a_2+d)x_3^2+(b_2+e)x_3+c_2 \bmod p = f_2(x_3)+dx_3^2+ex_3 \bmod p$$

which is equal to the initial first other remote share 64(*a*) plus $dx_3^2+ex_3$.

Updated second other remote share 64(*b*) is:

$$f_2'(x_4)=(a_2+d)x_4^2+(b_2+e)x_4+c_2 \bmod p = f_2(x_4)+dx_4^2+ex_4 \bmod p$$

which is equal to the initial second other remote share 64(*b*) plus $dx_4^2+ex_4$.

Thus, techniques for automatically propagating password updates onto other devices 38 that use a shared password to protect respective secure keys or other secrets have been provided. This may be done by calculating update data 56 using a new password 72 and an old password 70 entered onto one device 32 as part of a password change operation, and sending the update data 56 to the other devices 38 for use in updating the password on those devices 38.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A system comprising:
   a computing device configured to implement a (t, n) Shamir secret sharing scheme, the (t, n) Shamir secret sharing scheme providing access to a secret upon any t out of n shares being known for an integer t≥2 for an integer n>t, the computing device being further configured to:
   receive, from a user, a password-update command including a new password that supersedes an old password, the old password defining an old password share and the new password defining a new password share, the new password share superseding the old password share as a user password share of the (t, n) Shamir secret sharing scheme implemented by the computing device;
   calculate update data using the new password share and the old password share; and
   update one or more local shares of the (t, n) Shamir secret sharing scheme implemented by the computing device to be usable in conjunction with the new password share rather than the old password share to provide access to a secret key; and another computing device configured to implement the (t, n) Shamir secret sharing scheme to provide access to another secret key, the other computer device being further configured to:
receive the update data from the computing device; and
update the one or more local shares of the other computing device of the (t, n) Shamir secret sharing scheme implemented by the other computing device using the update data, permitting the user to utilize the other computing device to reconstruct the other secret key without entering the old password.

2. The system of claim 1 wherein:
receiving the password update command includes receiving the old password from the user;
calculating the update data includes applying a reversible operator to the new password share and the old password share;
updating the one or more local shares includes:
reconstructing the secret key using the (t, n) Shamir secret sharing scheme with the old password share and the one or more local shares; and
generating one or more updated local shares using the (t, n) Shamir secret sharing scheme with the reconstructed secret key and the new password share; and
updating the one or more local shares of the other computing device by the other computing device includes:
receiving the new password from the user;
reconstructing the old password share by applying the reversible operator in reverse to the update data and the new password share;
reconstructing the other secret key using the (t, n) Shamir secret sharing scheme with the old password share and the one or more local shares of the other device; and
generating one or more updated local shares of the other device using the (t, n) Shamir secret sharing scheme with the reconstructed other secret key and the new password share.

3. The system of claim 2 wherein the reversible operator is an exclusive-or operator.

4. The system of claim 2 wherein:
the system further comprises a cloud server storing one or more remote shares of the (t, n) Shamir secret sharing scheme implemented by the computing device and one or more remote shares for the other computing device of the (t, n) Shamir secret sharing scheme implemented by the other computing device;
the computing device is further configured to send the update data to the cloud server; and
the cloud server is configured to update the one or more remote shares and the one or more remote shares for the other computing device by:
receiving the new password from the user;
reconstructing the old password share by applying the reversible operator in reverse to the update data and the new password share;
reconstructing the secret key using the (t, n) Shamir secret sharing scheme with the old password share and the one or more remote shares;
reconstructing the other secret key using the (t, n) Shamir secret sharing scheme with the old password share and the one or more remote shares for the other device;
generating one or more updated remote shares using the (t, n) Shamir secret sharing scheme with the reconstructed secret key and the new password share; and
generating one or more updated remote shares for the other computing device using the (t, n) Shamir secret sharing scheme with the reconstructed other secret key and the new password share.

5. The system of claim 1 wherein:
the one or more local shares include a first local share and a second local share and the one or more local shares of the other computing device include a first local share of the other computing device and a second local share of the other computing device;
receiving the password update command includes receiving the old password from the user;
calculating the update data includes:
calculating a difference between the new password share and the old password share; and
generating two values, d and e, which sum to the calculated difference between the new password share and the old password share, the update data including d and e;
updating the one or more local shares includes adding a first function of d and e to the first local share and a second function of d and e to the second local share; and
updating the one or more local shares of the other computing device by the other computing device includes adding the first function of d and e to the first local share of the other computing device and the second function of d and e to the second local share of the other computing device.

6. The system of claim 5 wherein:
the (t, n) Shamir secret sharing scheme implemented by the computing device includes a first function $f_1(x)=a_1x^2+b_1x+c_1$, with the secret key being equal to $f_1(0)$, the old password share being equal to $f_1(1)$, the first local share being equal to $f_1(x_1)$, and the second local share being equal to $f_1(x_2)$ for pre-defined values, $x_1, x_2$;
adding the first function of d and e to the first local share by the other computing device includes adding $dx_1^2+ex_1$ to the first local share; and
adding the second function of d and e to the second local share by the other computing device includes adding $dx_2^2+ex_2$ to the second local share.

7. The system of claim 6 wherein:
the system further comprises a cloud server storing a first remote share and a second remote share, the first remote share being equal to $f_1(x_3)$, and the second remote share being equal to $f_1(x_4)$ for pre-defined values, $x_3, x_4$;
the computing device is further configured to send the update data to the cloud server; and
the cloud server is configured to update the first remote share and the second remote share by:
adding $dx_3^2+ex_3$ to the first remote share; and
adding $dx_4^2+ex_4$ to the second remote share.

8. The system of claim 6 wherein:
the (t, n) Shamir secret sharing scheme implemented by the other computing device includes a second function $f_2(x)=a_2x^2+b_2x+c_2$, with the other secret key being equal to $f_2(0)$, the old password share also being equal to $f_2(1)$, the first local share of the other computing device being equal to $f_2(x_1)$, and the second local share of the other computing device being equal to $f_2(x_2)$;
adding the first function of d and e to the first local share of the other computing device by the other computing device includes adding $dx_1^2+ex_1$ to the first local share of the other computing device; and adding the second function of d and e to the second local share of the other computing device by the other computing device includes adding $dx_2^2+ex_2$ to the second local share of the other computing device.

9. The system of claim 8 wherein:

the system further comprises a cloud server storing a first remote share for the other computing device and a second remote share for the other computing device, the first remote share for the other computing device being equal to $f_2(x_3)$, and the second remote share for the other computing device being equal to $f_2(x_4)$ for pre-defined values, $x_3$, $x_4$;

the computing device is further configured to send the update data to the cloud server; and the cloud server is configured to update the first remote share for the other computing device and the second remote share for the other computing device by:
adding $dx_3^2+ex_3$ to the first remote share for the other computing device; and
adding $dx_4^2+ex_4$ to the second remote share for the other computing device.

10. The system of claim 1 wherein:

the system further comprises a cloud server storing one or more remote shares of the (t, n) Shamir secret sharing scheme implemented by the computing device;

the one or more local shares include a first local share and a second local share and the one or more local shares of the other computing device include a first local share of the other computing device and a second local share of the other computing device;

calculating the update data includes:
reconstructing the old password share using the (t, n) Shamir secret sharing scheme implemented by the computing device with the one or more local shares and the one or more remote shares from the cloud server;
calculating a difference between the new password share and the old password share; and
generating two values, d and e, which sum to the calculated difference between the new password share and the old password share, the update data including d and e;

updating the one or more local shares includes adding a first function of d and e to the first local share and a second function of d and e to the second local share; and updating the one or more local shares of the other computing device by the other computing device includes adding the first function of d and e to the first local share of the other computing device and the second function of d and e to the second local share of the other computing device.

11. The system of claim 10 wherein:

the (t, n) Shamir secret sharing scheme implemented by the computing device includes a first function $f_1(x)=a_1x^2+b_1x+c_1$, with the secret key being equal to $f_1(0)$, the old password share being equal to $f_1(1)$, the first local share being equal to $f_1(x_1)$, and the second local share being equal to $f_1(x_2)$ for pre-defined values, $x_1$, $x_2$;

adding the first function of d and e to the first local share by the other computing device includes adding $dx_1^2+ex_1$ to the first local share; and adding the second function of d and e to the second local share by the other computing device includes adding $dx_2^2+ex_2$ to the second local share.

12. The system of claim 11 wherein:

the first remote share is equal to $f_1(x_3)$, and the second remote share is equal to $f_1(x_4)$ for pre-defined values, $x_3$, $x_4$;

the computing device is further configured to send the update data to the cloud server; and the cloud server is configured to update the first remote share and the second remote share by:
adding $dx_3^2+ex_3$ to the first remote share; and
adding $dx_4^2+ex_4$ to the second remote share.

13. The system of claim 11 wherein:

the (t, n) Shamir secret sharing scheme implemented by the other computing device includes a second function $f_2(x)=a_2x^2+b_2x+c_2$, with the other secret key being equal to $f_2(0)$, the old password share also being equal to $f_2(1)$, the first local share of the other computing device being equal to $f_2(x_1)$, and the second local share of the other computing device being equal to $f_2(x_2)$;

adding the first function of d and e to the first local share of the other computing device by the other computing device includes adding $dx_1^2+ex_1$ to the first local share of the other computing device; and adding the second function of d and e to the second local share of the other computing device by the other computing device includes adding $dx_2^2+ex_2$ to the second local share of the other computing device.

14. The system of claim 13 wherein:

the cloud server further stores a first remote share for the other computing device and a second remote share for the other computing device, the first remote share for the other computing device being equal to $f_2(x_3)$, and the second remote share for the other computing device being equal to $f_2(x_4)$ for pre-defined values, $x_3$, $x_4$;

the computing device is further configured to send the update data to the cloud server; and the cloud server is configured to update the first remote share for the other computing device and the second remote share for the other computing device by:
adding $dx_3^2+ex_3$ to the first remote share for the other computing device; and
adding $dx_4^2+ex_4$ to the second remote share for the other computing device.

15. A method performed by a computing device configured to implement a (t, n) Shamir secret sharing scheme, the (t, n) Shamir secret sharing scheme providing access to a secret upon any t out of n shares being known for an integer t≥2 for an integer n>t, the method comprising:

receiving, from a user, a password-update command including a new password that supersedes an old password, the old password defining an old password share and the new password defining a new password share, the new password share superseding the old password share as a user password share of the (t, n) Shamir secret sharing scheme implemented by the computing device;

calculating update data using the new password share and the old password share;

updating one or more local shares of the (t, n) Shamir secret sharing scheme implemented by the computing device to be usable in conjunction with the new password share rather than the old password share to provide access to a secret key; and sending the update data to another computing device configured to implement the (t, n) Shamir secret sharing scheme to provide access to another secret key, the other computing device being configured to update one or more local shares of the other computing device of the (t, n) Shamir secret sharing scheme implemented by the other computing device using the update data, permitting the user to utilize the other computing device to reconstruct the other secret key without entering the old password.

16. The method of claim 15 wherein:

receiving the password update command includes receiving the old password from the user;

calculating the update data includes applying a reversible operator to the new password share and the old password share; and updating the one or more local shares includes:
    reconstructing the secret key using the (t, n) Shamir secret sharing scheme with the old password share and the one or more local shares; and
    generating one or more updated local shares using the (t, n) Shamir secret sharing scheme with the reconstructed secret key and the new password share.

17. The method of claim 15 wherein:

the one or more local shares include a first local share and a second local share and the one or more local shares of the other computing device include a first local share of the other computing device and a second local share of the other computing device;

calculating the update data includes:
    reconstructing the old password share using the (t, n) Shamir secret sharing scheme implemented by the computing device with the one or more local shares and one or more remote shares from the cloud server of the (t, n) Shamir secret sharing scheme implemented by the computing device;
    calculating a difference between the new password share and the old password share; and
    generating two values, d and e, which sum to the calculated difference between the new password share and the old password share, the update data including d and e; and updating the one or more local shares includes adding a first function of d and e to the first local share and a second function of d and e to the second local share.

18. A computer program product comprising a non-transitory computer-readable storage medium storing a set of instructions, which, when executed by a computing device implement a (t, n) Shamir secret sharing scheme, the (t, n) Shamir secret sharing scheme providing access to a secret upon any t out of n shares being known for an integer t≥2 for an integer n>t, cause the computing device to:

receive, from a user, a password-update command including a new password that supersedes an old password, the old password defining an old password share and the new password defining a new password share, the new password share superseding the old password share as a user password share of the (t, n) Shamir secret sharing scheme implemented by the computing device;

calculate update data using the new password share and the old password share;

update one or more local shares of the (t, n) Shamir secret sharing scheme implemented by the computing device to be usable in conjunction with the new password share rather than the old password share to provide access to a secret key; and send the update data to another computing device configured to implement the (t, n) Shamir secret sharing scheme to provide access to another secret key, the other computing device being configured to update one or more local shares of the other computing device of the (t, n) Shamir secret sharing scheme implemented by the other computing device using the update data, permitting the user to utilize the other computing device to reconstruct the other secret key without entering the old password.

19. The computer program product of claim 18 wherein:

receiving the password update command includes receiving the old password from the user;

calculating the update data includes applying a reversible operator to the new password share and the old password share; and updating the one or more local shares includes:
    reconstructing the secret key using the (t, n) Shamir secret sharing scheme with the old password share and the one or more local shares; and
    generating one or more updated local shares using the (t, n) Shamir secret sharing scheme with the reconstructed secret key and the new password share.

20. The computer program product of claim 18 wherein:

the one or more local shares include a first local share and a second local share and the one or more local shares of the other computing device include a first local share of the other computing device and a second local share of the other computing device;

calculating the update data includes:
    reconstructing the old password share using the (t, n) Shamir secret sharing scheme implemented by the computing device with the one or more local shares and one or more remote shares from the cloud server of the (t, n) Shamir secret sharing scheme implemented by the computing device;
    calculating a difference between the new password share and the old password share; and
    generating two values, d and e, which sum to the calculated difference between the new password share and the old password share, the update data including d and e; and updating the one or more local shares includes adding a first function of d and e to the first local share and a second function of d and e to the second local share.

\* \* \* \* \*